June 6, 1967   W. R. BUECHLER   3,323,831
RETRACTABLE SEAT BELT CONSTRUCTION
Filed Feb. 27, 1963   5 Sheets-Sheet 1
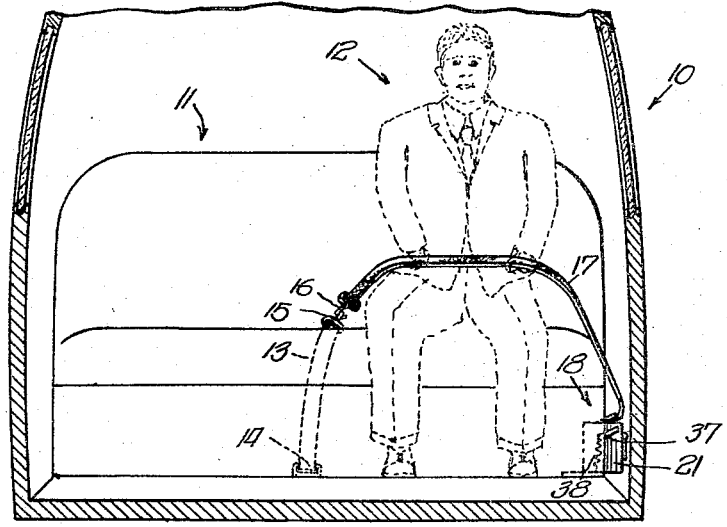
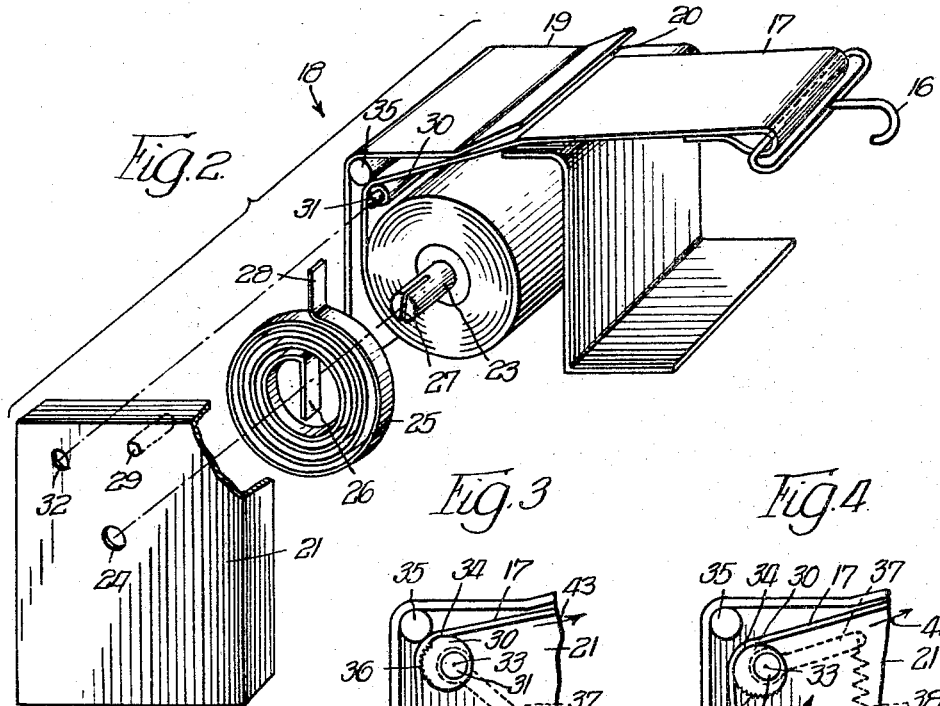
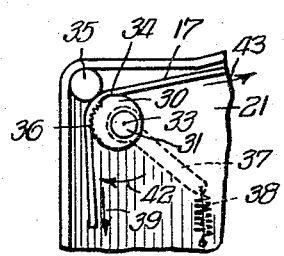
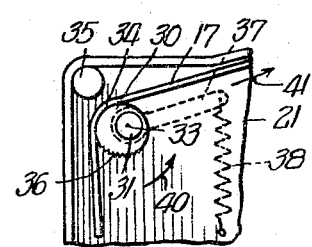
INVENTOR.
William R. Buechler,
BY Robert R. Lockwood
Atty.

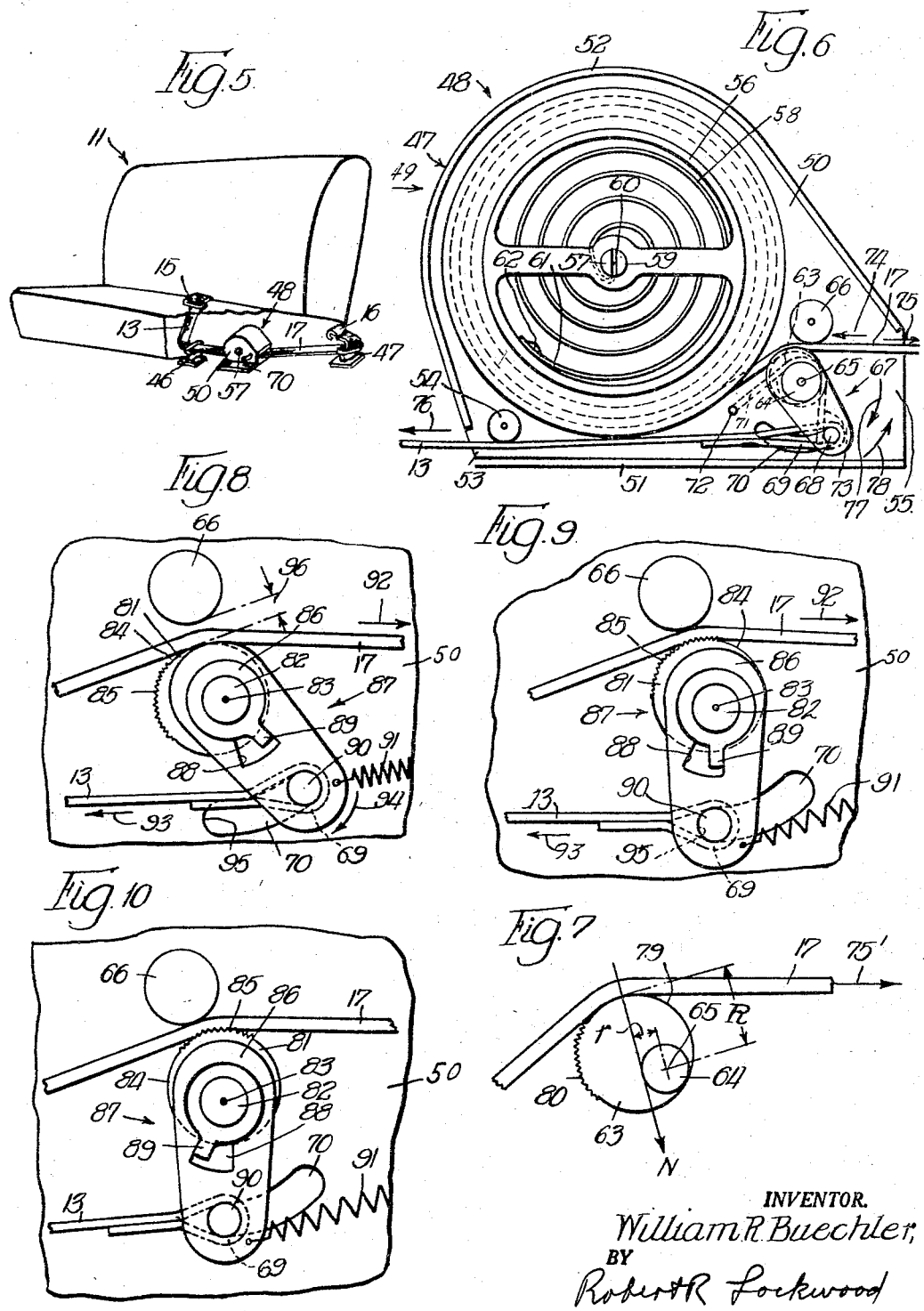

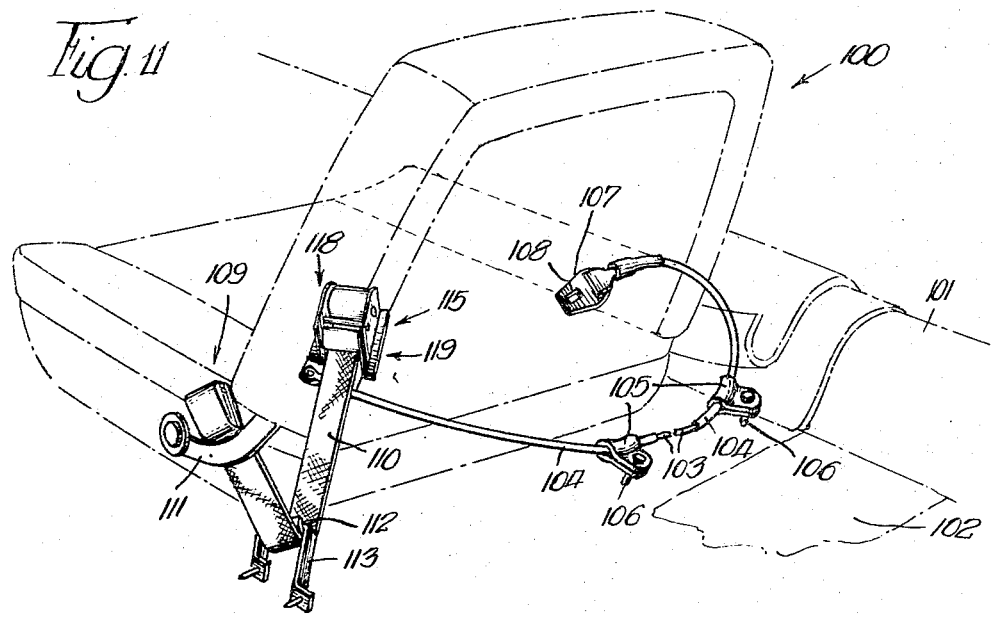
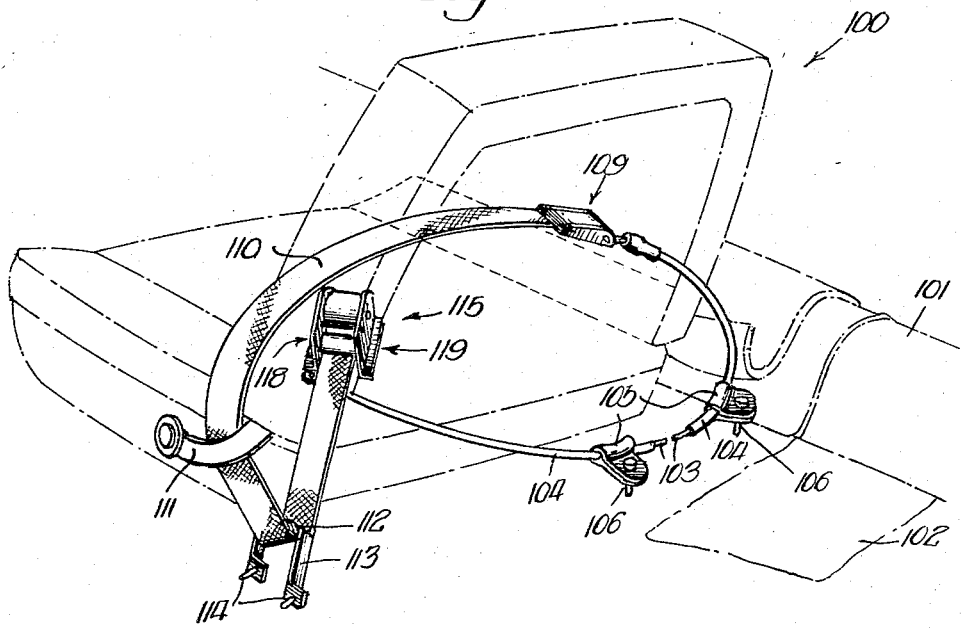

June 6, 1967 W. R. BUECHLER 3,323,831
RETRACTABLE SEAT BELT CONSTRUCTION
Filed Feb. 27, 1963 5 Sheets-Sheet 4
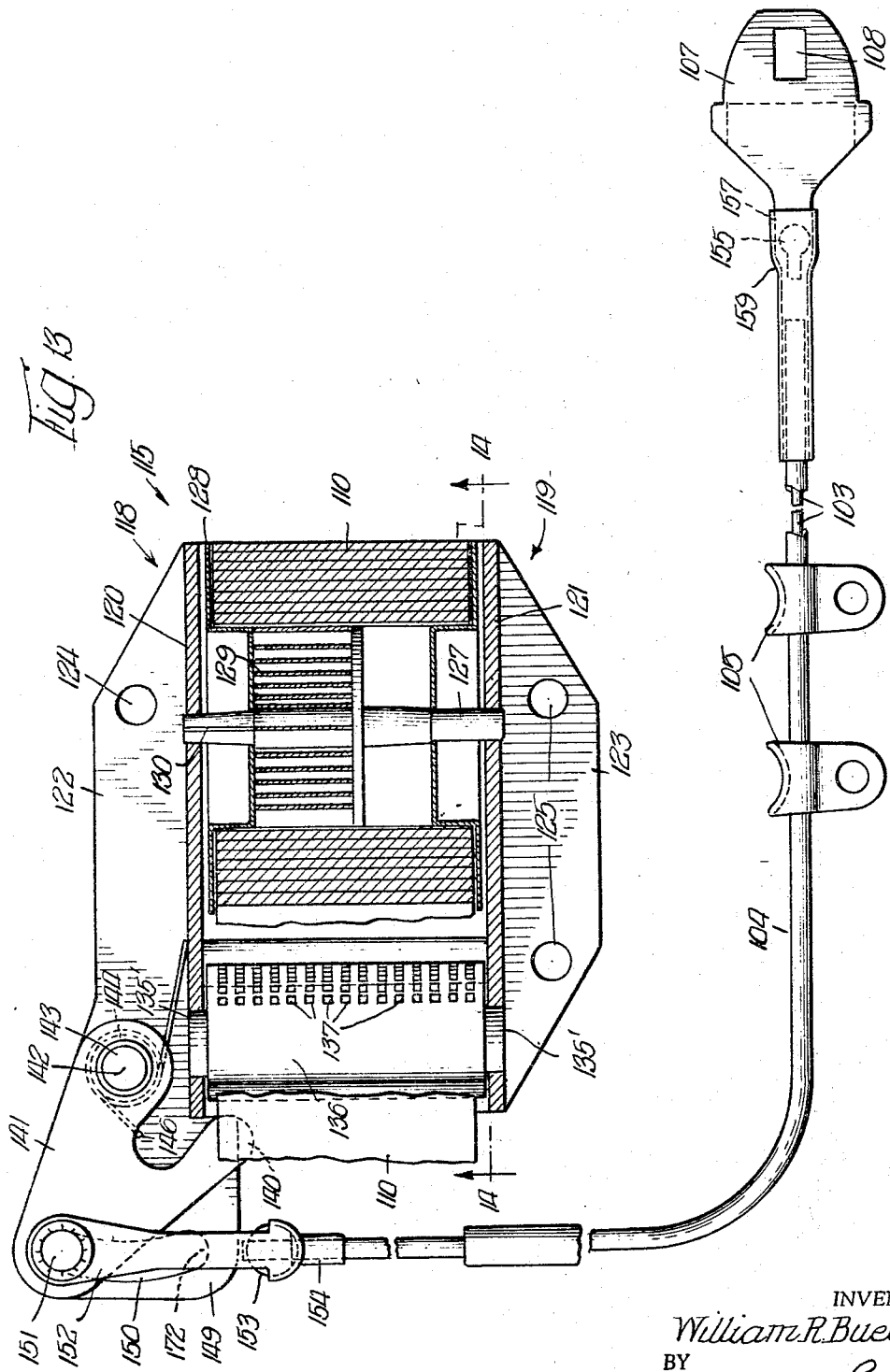
INVENTOR.
William R. Buechler,
BY
Robert R. Lockwood
atty June 6, 1967 W. R. BUECHLER 3,323,831
RETRACTABLE SEAT BELT CONSTRUCTION
Filed Feb. 27, 1963 5 Sheets-Sheet 5
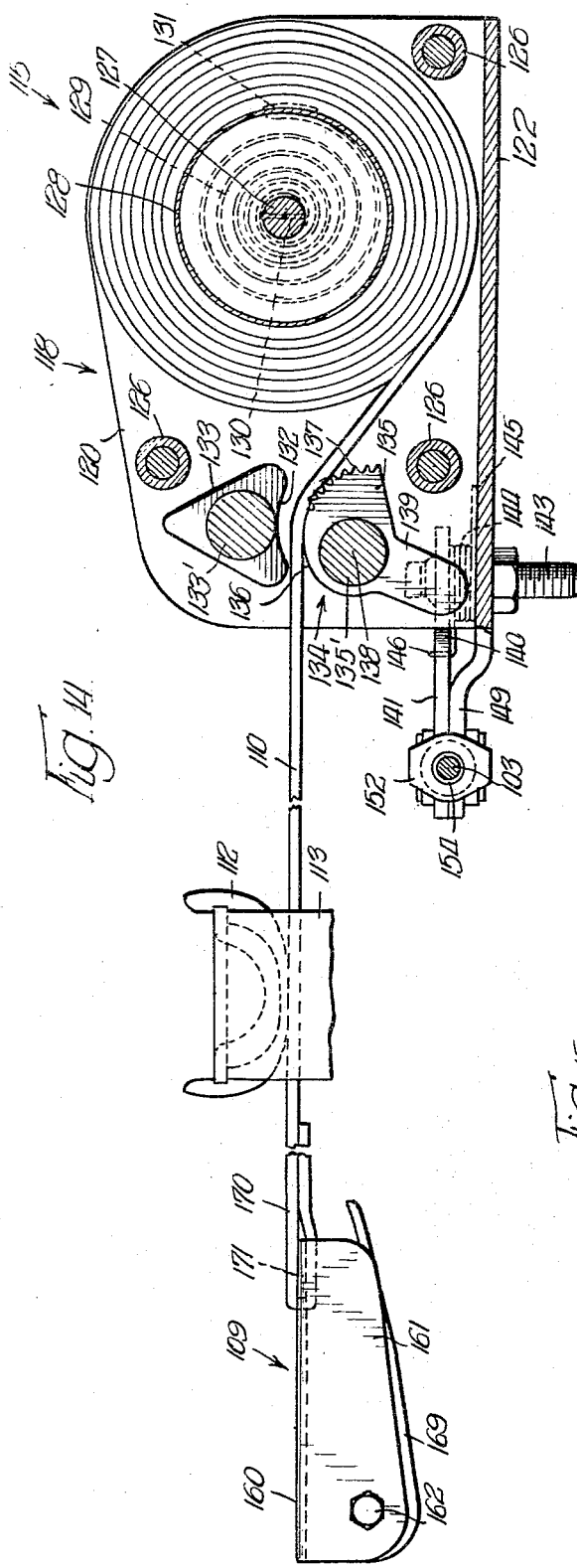
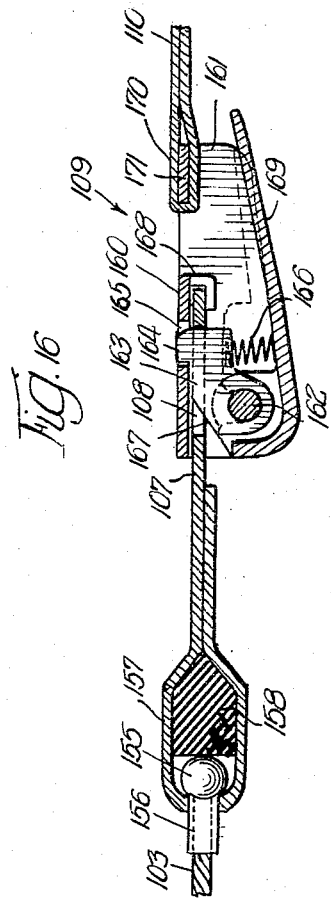
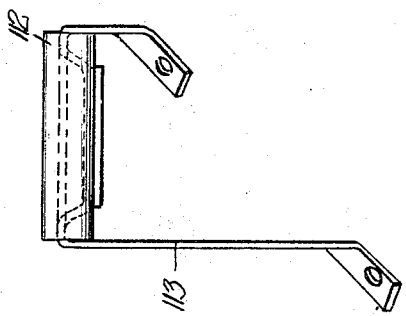
INVENTOR.
William R. Buechler,
BY
Robert R. Lockwood
ATTY.

United States Patent Office 3,323,831
Patented June 6, 1967

3,323,831
RETRACTABLE SEAT BELT CONSTRUCTION
William R. Buechler, Birmingham, Mich., assignor to Thompson Industries, Inc., Indianapolis, Ind., a corporation of Massachusetts
Filed Feb. 27, 1963, Ser. No. 261,343
17 Claims. (Cl. 297—388)

This invention relates, generally, to seat belts for vehicles, such as automobiles and airplanes, and it has particular relation to automatically retractable seat belts. The invention can be employed for shoulder harness operation, if desired.

The use of seat belts tends to lessen the serious effects of automobile accidents and reduces the likelihood of fatal injury. They are likewise useful in airplanes. The seat belts as presently constructed and available are satisfactory when they are used. Because of their generally unsightly appearance and cumbersome operation there is a tendency either not to provide seat belts, particularly in automobiles, or to neglect to use them if they are provided. The present invention has for its primary purpose the overcoming of these objections and providing a seat belt construction that is simple and efficient in operation and can be readily and economically manufactured and installed.

Among the other objects of this invention are: To provide for retracting a seat belt or the like in a new and improved manner and to store the seat belt so that it does not interfere with a person entering or leaving the seat; to permit extension of the belt in an amount sufficient to encompass the seat occupant and to prevent further extension and to hold the occupant in the seat on rapid deceleration of the vehicle; to provide for manual release of locking means employed to prevent further extension of the belt so as to permit retraction thereof; to provide anchor means such as an anchor belt or anchor cable for cooperation with the retractable belt; to cause tension force applied to the anchor belt or anchor cable to control the extension of the retractable belt; to employ the tensions applied to the anchor belt or anchor cable and to the retractable belt to limit the etxension of the latter; to employ tension applied to the anchor belt or anchor cable to initiate a restraining action on the retractable belt and then to prevent further restraining action on the retractable belt by further application of tension to the anchor belt; to maintain the restraining action on the retractable seat belt after further restraining action thereon by the anchor belt or anchor cable ceases by a self energizing action of a cam under the control of the tension applied by the occupant to the seat belt; to avoid the application of the force that is exerted on the retractable seat belt by the seat occupant incident to rapid deceleration of the vehicle to the mechanism that functions to retract the seat belt when it is not in use; to transmit the force applied to the anchor belt or anchor cable through a lever which cooperates with an eccentric locking cam that clamps the retractable seat belt between it and a stationary cam shoe; to mount the lever for rotation about an axis that is at right angles to a plane which is parallel to the axis of rotation of the eccentric locking cam; to limit the rotation of the lever and thereby the clamping force transmitted by it to the eccentric locking cam; and to bias the lever to an initial position from which it is rotated on application of force to the anchor belt or anchor cable.

Other objects of this invention will, in part, be obvious and in part appear hereinafter.

In the drawings:

FIG. 1 is a view of a portion of a vehicle showing a person occupying a seat thereon and held in place by a retractable seat belt of the present invention.

FIG. 2 is a perspective view of the retracting mechanism for the seat belt, the parts being shown in spaced relation.

FIG. 3 is a vertical elevational view at an enlarged scale of a portion of the retracting mechanism showing the locking mechanism in one position.

FIG. 4 is a view, similar to FIG. 3, showing the locking mechanism in another position.

FIG. 5 is a perspective view showing another embodiment of the invention as applied, in part, to the underside of a seat of a vehicle.

FIG. 6 is a view in end elevation and at an enlarged scale, one side plate being removed, showing the seat belt retracting mechanism employed in the construction illustrated in FIG. 5.

FIG. 7 shows the application of the various torques to the eccentric cam shown in FIG. 6.

FIG. 8 is a view, somewhat diagrammatic in character, which shows another seat belt locking and releasing mechanism.

FIG. 9 is a view, similar to FIG. 8, showing the locking mechanism in one alternate position.

FIG. 10 is a view, similar to FIG. 8, showing the locking mechanism in another alternate position.

FIG. 11 is a perspective view of another embodiment of the retractable seat belt construction embodying this invention, the belt being shown in the retracted position in conjunction with a bucket type seat that is shown in broken line outline on the floor of a conventional type of automobile having the usual tunnel for accommodating the drive shaft.

FIG. 12 is a view, similar to FIG. 11, but showing the retractable seat belt and the flexible anchor cable in the position that they occupy when encompassing an occupant on the seat.

FIG. 13 is a top plan view of the retracting mechanism and anchor cable, certain parts being shown in section in order to illustrate the details of construction.

FIG. 14 is a sectional view taken generally along the line 14—14 of FIG. 13.

FIG. 15 is a view, in side elevation, of the sill bracket.

FIG. 16 is a vertical sectional view showing how the buckle plate is clamped to the buckle which is fastened to the outer end of the retractable belt.

Referring now particularly to FIG. 1 of the drawings it will be observed that the reference character 10 designates, generally, a vehicle such as an automobile, airplane or the like, that is provided with a seat that is indicated, generally, at 11. A seat occupant is indicated at 12 and is shown with anchor means that may comprise an anchor belt 13. The anchor belt 13 extends between seat portions, as is conventional practice, and is secured at 14 to the floor of the vehicle 10. Instead of employing the anchor belt 13, other anchor means can be used, such as a tie rod or a flexible steel cable attached at 14 to the vehicle floor. The other end of the anchor belt 13 is provided with an eye 15 just above horizontal portion of the seat 11 that is arranged to be engaged by a hook 16 at one end of a retractable belt 17 which extends from a retracting mechanism, shown generally at 18, that is securely mounted to the floor of the vehicle 10.

The anchor means in the form of the anchor belt 13 and the retracting mechanism 18 are disclosed herein as being secured to the floor of the vehicle 10. While this is the preferred location, they may be secured to other parts of the vehicle 10, such as the doors, that are fixed to the vehicle when it is in motion. This observation is applicable to the several forms of anchor means and retracting mechanisms disclosed herein.

It will be understood that the belts 13 and 17 can be formed of any suitable material, such as webbing, which is sufficiently strong to withstand the stresses applied thereto and that the belt 17 is wide enough to distribute these stresses over a substantial area of the body of the seat occupant 12.

FIG. 2 shows in more detail the construction of the retracting mechanism 18. Here it will be observed that it includes a metallic housing 19 which is provided with a slot 20 in the top through which the belt 17 extends and in which it can be extended or retracted. End plates 21—21 serve to close off the ends of the metallic housing 19 and also serve to mount certain of the mechanism located therein.

It will be observed that the retractable belt 17 is wound on reel means in the form of a main shaft 23 which is journaled at 24 in one of the end plates 21 and is similarly journaled (not shown) in the other end plate. A retraction spring 25 serves automatically to wind up or retract the belt 17 when it is released for such operation. An inner end 26 of the retraction spring 25 extends through a slot 27 in the main shaft 23 while an outer end 28 is arranged to react against a spring stop 29 that extends inwardly from the end plates 21, as shown. In this manner the retraction spring 25 is strained between the main shaft 23 and the spring stop 29 and the arrangement is such that, when the retractable belt 17 is fully wound on the main shaft 23, there is still substantial tension exerted thereon by the retraction spring 25 to insure that the belt 17 is held in the fully retracted position.

The use of the spring driven reel means as disclosed herein for retracting the belt 17 is preferred since it requires a minimum of space. However, other retracting means can be employed particularly since its main function is to retract the belt 17 and none of the force applied to the belt 17 by the seat occupant is required to be resisted by or through the belt retracting means. Instead of the reel type of retracting means the belt 17 can extend under the seat 11 in the form of a loop with suitable biasing means connected to the bight for maintaining retracting tension thereon while permitting the belt 17 to be extended around the seat occupant.

In order to control the movement of the retractable belt 17 an eccentric cam 30 is provided. It is mounted on trunnions 31 (only one being shown) which are rotatably mounted at 32 in the end plates 21. The axis of rotation of the trunnions 31 is indicated at 33 and it will be observed that this is offset from the center of the surface of the eccentric cam 30. Now it will be observed that the eccentric cam 30, which extends entirely transversely across the retractable belt 17, has a smooth surface portion 34 over approximately three-fourths of its surface and that the belt 17 in FIG. 4, for example, is positioned over this smooth surface portion 34 for a limited arcuate extent and in spaced relation to stop shaft 35 which is stationarily mounted inside of the upper left corner of the metallic housing 19. It may be secured by any suitable means such as by welding. For the remaining approximately one-fourth of the surface of the eccentric cam 30 there is provided a knurled portion 36 which is arranged to grip the retractable belt 17 and cause rotation of the eccentric cam 30 about its axis 33 of rotation.

Extending rigidly from the eccentric cam 30 and radially of the axis 33 of rotation thereof is an arm 37 that is arranged to be biased by a tension spring 38 for the purpose of normally positioning the eccentric cam 30 as shown in FIG. 3.

In describing the operation of the retracting mechanism 18 it will be assumed that initially the retractable belt 17 occupies the position shown in FIG. 2. Here the retraction spring 25 acts to tension the belt 17 in the direction indicated by the arrow 39 in FIG. 3 either to rotate the main shaft 23 for winding the belt 17 or for holding it in the wound or retracted position. This is permitted since the underside of the belt 17 can readily slide over the smooth surface portion 34 of the eccentric cam 30. Now, when the seat occupant 12 wishes to apply the belt 17, the belt 13 is positioned as indicated in FIG. 1. Then with one hand the retractable belt 17 is grasped while with the other hand the arm 37 is rotated in the direction indicated by the arrow 40 in FIG. 4, followed by the application of tension to the retractable belt 17 in the direction indicated by the arrow 41. The rotation of the arm 37 in the direction indicated by the arrow 40 swings the eccentric cam 30 away from the juxtaposed surface of the stop shaft 35 and moves the knurled portion 36 entirely out of engagement with the underside of the belt 17. The belt 17 then can be readily drawn over the smooth surface portion 34 of the eccentric cam 30 to an extent sufficient to permit the hook 16 to engage the eye 15. During this movement the retraction spring 25 is additionally stressed. After the hook 16 has engaged the eye 15, the arm 37 is released and the tension spring 38 then rotates the arm 37 in the direction indicated by the arrow 42 in FIG. 3. This brings the knurled portion 36 into operative position with respect to the underside of the belt 17. Now should the vehicle 10 rapidly decelerate, there is a tendency for the seat occupant 12 to continue at the same speed with the result that tension forces are applied to the anchor belt 13 and to the retractable belt 17. The tension force applied to the belt 17 is in the direction indicated by the arrow 43 in FIG. 3. This tends to rotate the eccentric cam 30 in the direction indicated by the arrow 42 about the axis 33 and to wedge the belt 17 between the eccentric cam 30 and the juxtaposed surface of the stop shaft 35. As a result, there is only a very slight movement of the retractable belt 17 until it is prevented from further movement and it acts with the anchor belt 13 to hold the seat occupant 12 securely in place on the seat 11. The greater the force applied to the retractable belt 17 in the direction indicated by the arrow 43 the greater will be the tendency of the belt 17 to be held between the eccentric cam 30 and the stop shaft 35.

When it is desired to remove the belt 17, the seat occupant 12 takes up the slight slack and unhooks the hook 16 from the eye 15. Then the arm 37 is rotated manually in the direction indicated by the arrow 40 to rotate the eccentric cam 30 to the position shown in FIG. 4. Thereupon the retraction spring 25 acts on release of the hook end of the retractable belt 17 to wind it or retract it onto the main shaft 23. Here the belt 17 is completely withdrawn from the interior of the vehicle 10 and is out of the way leaving only the anchor belt 13 at the intermediate portion of the seat 11.

When the hook 16 is released from the eye 15, the retraction spring acts in the direction of the arrow 39 to pull the belt 17 into the housing 19 and wind it around the shaft 23. This movement of the belt 17 drags the knurled surface 36, if it is not rotated out of the way by rotation of the arm 37, and rotates the cam 30, as indicated by the arrow 40, until the belt 17 engages the smooth surface portion 34 over which it can slip without further rotation of the cam 30. Such rotation of the cam 30 about the axis 33 causes it to move away from the stop shaft 35 and thereby release the wedging action applied by it and the cam 30 to the belt 17.

Another embodiment of the invention is shown in FIGS. 5 and 6 of the drawings. Here it will be observed that the seat 11, previously referred to, is shown together with the anchor belt 13 having the eye 15 for engagement by the hook 16 of the retractable belt 17. The manner in which the belts 13 and 17 are controlled is different from that described hereinbefore and will be apparent as this description proceeds.

The anchor belt 13 extends centrally of the seat 11 between the back and seat portions thereof and through a floor eyelet 46 that is secured to the floor of the vehicle 10. In a similar manner the retractable belt 17 extends through a floor eyelet 47 also secured to the floor of the vehicle 10. In this embodiment of the invention the belts 13 and 17 extend from a retracting mechanism that is shown, generally, at 48 and is located inwardly of the outer side of the seat 11 and preferably completely underneath it. The retracting mechanism 48 is securely fastened to a part of the vehicle 10 that is fixed to the vehicle when it is in motion.

FIG. 6 shows the retracting mechanism 48 in more detail. Here it will be observed that it includes a metallic housing 49 which has end plates 50—50, one being omitted in FIG. 6. Also it includes a bottom plate 51 that is secured by suitable means to the floor of the vehicle 10. Between the end plates 50—50 is a curved cover 52 which forms with one end of the bottom plate 51 a slot 53 through which the anchor belt 13 extends as directed by a guide 54 that is mounted between the end plates 50—50. At the other end of the metallic housing 49 there is a slot 55 between the cover 52 and the bottom plate 51 for the extension and retraction of the belt 17.

It will be noted that the belt 17 extends into the metallic housing 49 through the slot 55 and that it is wound on reel means in the form of a spool or drum 56 that is rotatably mounted on a stationary shaft 57 the ends of which are mounted on the end plates 50—50. Within the spool or drum 56 is a retraction spring 58 the inner end 59 of which extends into a slot 60 in the stationary shaft 57 while its outer end 61 is secured at 62 to the inside of the spool or drum 56. It will be understood that the retraction spring 58 is pretensioned to such an extent that, when the belt 17 is completely wound thereon to the extent permitted by the floor eyelet 47, there still is some tension in it for the purpose of holding the belt 17 in the retracted position.

In order to control the extension of the belt 17 an eccentric cam 63 is provided which functions in a manner similar to the cam 30 previously described. The eccentric cam 63 has trunnions 64 at its ends (only one being shown) that are journaled in the end plates 50—50 to rotate about an axis 65 of rotation with respect to which the surface of the cam 63 is eccentric. Positioned opposite to the eccentric cam 63, which extends transversely of the belt 17, is a stop shaft or clamp 66. It is stationarily mounted between the end plates 50—50 and is arranged to clamp or wedge the belt 17 between it and the surface of the eccentric cam 63.

Secured to and extending rigidly radially from the eccentric cam 63 is an arm assembly, shown generally at 67, which may comprise a pair of arms and which correspond generally to the arm 37 previously described. The distal ends of the arms are interconnected by a transverse rod 68 over which one end of the anchor belt 13 is looped as indicated at 69. The ends of the transverse rod 68 extend through arcuate slots 70—70 in the plates 50—50.

Normally, the arm assembly 67 is biased by a torsion spring 71 to the position shown in FIG. 6 where the ends of the transverse rod 68 are located against the right ends of the arcuate slots 70 the centers of which, it will be understood, are along the axis 65 of rotation of the eccentric cam 63. One end 72 of the torsion spring 71 is anchored to the adjacent end plate 50 while the other end 73 bears against the transverse rod 68.

In operation, when the belts 13 and 17 are not applied to occupy the positions shown in FIG. 5, the retraction spring 58 applies a force to the belt 17 in the direction indicated by the arrow 74 to hold it in the retracted position on the spool or drum 56. When the belts 13 and 17 are to be fastened, a tension force is applied to the belt 17 in the direction indicated by the arrow 75 and it is withdrawn from the spool or drum 56 to the extent necessary to permit the hook 16 to engage the eye 15. This is readily permitted since the torsion spring 71 holds the arm assembly 67 in the position shown in FIG. 6 where the surface of the eccentric cam 63 is spaced far enough away from the stop shaft or clamp rod 66 to permit free movement of the belt 17. As soon as the eye 15 is engaged by the hook 16 the anchor belt 13 becomes an extension of the retractable belt 17 and the tension of the spring 58 is applied to the arm assembly 67.

Should the vehicle 10 be suddenly decelerated with the belts 13 and 17 fastened over the occupant of the seat 11 in the manner described, additional tension force will be applied to the anchor belt 13 in the direction indicated by the arrow 76 as well as additional tension force will be applied to the belt 17 in the direction indicated by the arrow 75. The additional tension applied to the anchor belt 13 in the direction indicated by the arrow 76 causes the arm assembly 67 to rotate in the direction indicated by the arrow 77. This swings the surface of the eccentric cam 63 toward the stop shaft or clamp rod 66 with the result that the tension force applied to the belt 17 in the direction indicated by the arrow 75 causes the eccentric cam 63 to become self energizing and thus merely tightens the gripping or wedging relationship between the eccentric cam 63 and the juxtaposed surface of the stop shaft or clamp rod 66. As a result only slight movements of the belts 13 and 17 are permitted before no further movement thereof can take place in the directions indicated by the arrows 75 and 76 and the seat occupant is held firmly in position in the seat 11.

When the force applied to the belt 13 is removed as is the case when the hook 16 is removed from the eye 15, the torsion spring 71 restores the arm assembly 67 to the position shown in FIG. 6 and, on release of the belt 17, the retraction spring 58 rotates the spool or drum 56 to wind up the belt 17.

FIG. 7 illustrates the application of the various torques to the cam 63 which is eccentric with respect to the axis 65 and has a smooth surface portion 79 and a knurled portion 80. The arrow N represents the normal force applied to the surface of the cam 63 at a radius $r$ from the axis 65 on application of tension to the belt 17 as indicated by the arrow 75'. A counterclockwise torque about the axis 65 is applied to the cam 63 which is equal to $Nr$. A clockwise torque is also applied to the cam 63 about the axis 65 due to friction drag of the belt 17 on the cam surface which is equal to $aNR$ where $a$ is the effective coefficient or friction between the belt 17 and the cam 63, N is the normal force above mentioned and R is the effective radius from the axis 65 to this drag force. The torque applied in a counterclockwise direction to the cam 63 by the spring 71, FIG. 6, about the axis 65 can be represented as $Ts$ while the torque applied to the cam 63 in the clockwise direction about the axis 65 by the pull of the anchor belt 13 can be represented as $Tb$. The total resultant effective torque $T_t$ applied to the cam 63 about the axis 65 can be expressed as follows:

$$T_t = aNR - Nr + Tb - Ts$$

The direction of the torque applied to the cam 63 is clockwise if $T_t$ is positive and is counterclockwise if $T_t$ is negative.

When the belt 17 is pulled out by the operator in order to hook it into belt 13, the cam 63 is held in counterclockwise position away from the stop shaft 66. Belt 13 torque $Tb$ is not brought into play and therefore is zero. The smooth surface 79 between the cam 63 and the belt 17 has a relatively low coefficient of friction so that the drag torque $aNR$ is very small in comparison to the normal force torque $Nr$ and the spring torque $Ts$ both of which are negative. The summation of torques $T_t$ in this case is predominantly negative so that the cam 63 rotates counterclockwise.

After the belts 13 and 17 are hooked together and a further pull is exerted on both of them the belt torque $Tb$ is brought into play on the cam 63. This is of sufficient magnitude to dominate all the other torques so that the cam 63 will rotate clockwise. This rotation by the belt torque $Tb$ is sufficient to bring the knurled surface 80 into contact with the belt 17 before it reaches its limit and drops to zero. At this point, however, the coefficient of friction $a$ has increased sufficiently to make the drag torque $aNR$ dominant on the cam 63. By this rotation of the cam 63, the radius $r$ has decreased considerably so that the torque $Nr$ approaches zero. The arrangement is such that the drag torque $aNR$ is considerably higher than the spring torque $Ts$ so that the cam 63 will be rotated clockwise, thus providing a self energizing clamping action.

When the belt 17 is unhooked from belt 13 and retraction of the former is required, the cam 63 must be rotated counterclockwise to unclamp the belt 17 from between the cam 63 and the stop shaft 66. The belt 13 torque $Tb$ in this case is zero. The drag torque $aNR$ has reversed direction so that its sign is negative. Thus with the drag torque, the normal force torque, and the spring torque all being negative, the cam 63 will be rotated counterclockwise to accomplish the unclamping action.

Another embodiment of the invention is shown in FIGS. 8, 9 and 10 of the drawings. The construction here illustrated is similar to that shown in FIGS. 5 and 6 and described hereinbefore. Accordingly, only those parts which are different are shown together with certain of the related parts to an extent sufficient to comprehend this further modification. Here it will be observed that an eccentric cam 81 is provided which corresponds to the eccentric cam 63 shown in FIG. 6. It has trunnions 82 at opposite ends for rotatably mounting the eccentric cam 81 about an axis 83 of rotation, the trunnions 82 being rotatably mounted in the end plates 50—50 as will be understood readily. The eccentric cam 81 is provided with a smooth surface portion 84 for a major portion of its periphery and with a knurled portion 85 for a minor portion of its periphery. The eccentric cam 81 extends transversely underneath the belt 17. Bearing portions 86 are provided at opposite ends of the eccentric cam 81 on which an arm assembly 87, corresponding to the arm assembly 67, is journaled for limited relative movement. The arm assembly 87, which comprises a pair of arms, has slots 88 in each for receiving a tang or detent 89 that forms a part of the eccentric cam 81 and limits the relative movement between it and the arm assembly 87. This arrangement provides a lost motion connection between the eccentric cam 81 and the arm assembly 87. At the outer end, the arm assembly 87 is provided with a transverse rod 90, corresponding to the transverse rod 68, which is arranged to receive the looped end 69 of the anchor belt 13. In order to bias the arm assembly 87 to the position shown in FIG. 8, a coil tension spring 91 is provided although it will be understood that the torsion spring 71, previously described, is preferable. The ends of the transverse rod 90 move in the arcuate slots 70—70 in the end plates 50—50. Here the ends of the slots 70—70 act to limit the movement of the transverse rod 90 in both directions.

FIG. 8 shows the normal position of the locking mechanism when there is no stress applied to the anchor belt 13. Here the arm assembly 87 is held in the position shown by the spring 91 and the transverse rod 90 engages one end of the slots 70—70. When the belt 17 is pulled out in the direction indicated by the arrow 92 to encompass an occupant on the seat 11, the friction force against the smooth surface 84 of the eccentric cam 81 is not sufficiently high to overcome a counter torque of the normal force which causes the torque in a direction opposite to the self energizing torque of the cam 81 and, as a result, the eccentric cam 81 remains in the position here shown. This is in accordance with the torque analysis set forth above in connection with FIG. 7. It will be understood that the belt 17 is pulled out to an extent sufficient to permit its hook to be secured to the eye 15 of the belt 13.

Now when the vehicle 10 suddenly is decelerated with the belts 13 and 17 encompassing the seat occupant, a stress in the direction indicated by the arrow 93, FIG. 8, is applied to the belt 13. As a result the arm assembly 87 is rotated in the direction indicated by the arrow 94, the spring 91 is tensioned and the ends of the transverse rod 90 move to the opposite ends of the slots 70—70 where further movement of them and of the arm assembly 87 is prevented on engagement with the ends thereof as indicated at 95.

The alternate position of the arm assembly 87 and associated parts is indicated in FIG. 9. Since the tang or detent 89 engages one side of the slot 88, the eccentric cam 81 is rotated to bring the knurled portion 85 into engagement with the underside of the belt 17 and the clearance 96, FIG. 8, between the eccentric cam 81 and the stop shaft or clamp rod 66 is correspondingly reduced. Since the transverse rod 90 is prevented from further movement by engagement with the ends 95 of the slots 70—70, the further application of stress to the belt 13 in the direction indicated by the arrow 93 is taken up by the end plates 50—50 and is not transmitted to the eccentric cam 81 and to the stop shaft or clamp rod 66. However, the continued application of tension stress to the belt 17 in the direction indicated by the arrow 92 causes the eccentric cam 81 to rotate slightly to the position shown in FIG. 10 where the tang or detent 89 moves through the slot 88 relative to the arm assembly 87. This further closes the clearance indicated at 96, FIG. 8, but the only force that must be resisted by the eccentric cam 81 and the stop shaft or clamp rod 66 is that exerted by the belt 17.

When the forces exerted on the belts 13 and 17 in the direction indicated by the arrows 92 and 93 are removed, the spring 91 returns the arm assembly 87 to the position shown in FIG. 8.

FIGS. 11 to 16 show still another embodiment of this invention in which is incorporated certain of the principles of construction and operation of the retracting mechanisms shown in the preceding figures and described hereinbefore. Attention is directed particularly to FIGS. 11 and 12 where the reference character 100 designates, generally, a seat of the bucket type with which the present invention can be employed. It will be understood that a seat of the bench type, such as shown in FIGS. 1 and 5 and described hereinbefore, can be employed also. For illustrative purposes it is pointed out that the seat 100 is positioned between a side sill (not shown) of an automobile and a tunnel 101 that extends upwardly from the floor 102, the tunnel 101 being provided, as is conventional in many automotive vehicles, to receive the drive shaft when the engine is located in the front of the vehicle.

In this embodiment of the invention the seat belt construction employs a flexible steel stranded anchor cable 103 as the anchor means instead of the anchor belt previously described. The anchor cable 103 is slidably positioned within a cable guide tube 104 that may be formed of suitable flexible plastic material and secured in place on the floor 102 by floor brackets 105—105. Bolts 106—106 extend through the ears of the floor brackets 105—105 for securing then in place on the floor 102. The floor brackets 105—105 secure the cable guide tube 104 against movement while permitting the anchor cable 103 to slide freely therethrough.

At its outer end the anchor cable 103 has a buckle plate 107 secured thereto. It is provided with a rectangular aperture 108 to permit attachment to and detachment from a buckle that is designated, generally, at 109 and is of conventional construction. Suitably attached to the buckle 109 is one end of a retractable belt 110 that, together with the anchor cable 103, is arranged to encompass the occupant of the seat 100 when the buckle plate is fastened to the buckle 109. The retractable belt 110 is guided through a hockey stick clip 111 that is suitably mounted to one side of the seat 100 at such a position that, when the belt 110 is fully retracted, the buckle 109 is located slightly below the level of the seat portion of seat 100 and thus is out of the way of the seat occupant entering or leaving the seat. The belt 110 is guided over an insert 112 that is carried by a sill bracket 113, FIG. 15, that is arranged to be secured by bolts 114—114 to the side sill (not shown) of the vehicle. The sill bracket 113 is so positioned as to direct the belt 110 in its movement from and to a retracting mechanism that is indicated, generally, at 115, is located preferably beneath the seat 100 and the details of construction of which are shown more clearly in FIGS. 13 and 14.

The retracting mechanism 115 includes a support structure that comprises L-shaped retainer supports 118 and 119 that are formed of suitable material such as sheet steel. They include upstanding walls 120 and 121 having integral outwardly extending base plate sections 122 and 123. The base plate section 122 is provided with a bolt hole 124 and the base plate section 123 has bolt holes 125—125 for receiving suitable bolts to clamp securely the retracting mechanism 115 to the floor 102 of the vehicle. It will be understood that the floor 102 is considered to be a part of the vehicle that is fixed thereto when it is in motion. However, it is contemplated that the retracting mechanism 115 can be located at other parts of the vehicle such as in a door which, when the vehicle is in motion is fixed thereto. The upstanding walls 120 and 121 are maintained in parallel spaced apart relation by suitable spacers 126 that may be three in number with the ends projecting through the upstanding walls 120 and 121 and suitably secured thereto as by welding.

A stationary arbor 127 extends through the upstanding walls 120 and 121 and it has rotatably mounted thereon a reel 128 on which the retractible belt 110 is wound. In order to rotate the reel 128 in a direction to wind the belt 110 thereon a spiral spring 129 is employed and it is located within the reel 128. One end of the spiral spring 129 is anchored in a longitudinally extending slot 130 in the stationary arbor 127 while the other end of the spiral spring 129 is anchored at 131 to the reel 128. The spiral spring 129 is tensioned in such a direction that it acts to bias the reel 128 in a reeling direction and it is provided with sufficient initial tension to hold the belt 110 in the retracted position with the buckle 109 against the clip 111 as shown in FIG. 11. The spiral spring 129 is additionally tensioned when the belt 110 is withdrawn from the reel 128 to attach the buckle 109 to the buckle plate 107. As will appear hereinafter the tension thus exerted by the spiral spring 129 on the belt 110 and through the buckle 109 and buckle plate 107 to the anchor cable 103 is employed for the purpose of clamping the belt 110 and preventing further extension of it from the reel 128.

As shown more clearly in FIG. 14 the belt 110 extends from the reel 128 underneath a reaction surface 132 that is concave in configuration and faces downwardly from a generally triangularly shaped cam shoe 133 having reduced diameter end sections 133' that provide trunnions for rotatably mounting it in the upstanding walls 120 and 121. The belt 110 extends over an eccentric cam surface, shown generally at 134, on a clamping cam 135 which is provided with trunnions 135' for rotatably mounting it between the upstanding walls 120 and 121. The eccentric cam surface 134 includes a smooth surface portion 136 over which the belt 110 can be moved with a minimum of friction and a knurled surface portion 137 that is arranged to provide a relatively high coefficient of friction with respect to the belt 110 when the clamping cam 135 is rotated about its horizontal axis 138 to move toward the reaction surface 132 on the cam shoe 133 for transversely clamping the belt 110 therebetween. It will be observed that the horizontal axis 138 about which the clamping cam 135 rotates is located below the cam shoe 133 and is offset to the side away from the reel 128 with the eccentric cam surface 134 underlying the belt 110 and movable toward and away from the reaction surface 132 on the clamp shoe 133 for the purpose of clamping the seat belt 110 therebetween.

For moving the clamping cam 135 into clamping position, it is provided with a depending arm 139 that extends radially from the horizontal axis of rotation 138 into the path of a finger 140 that is carried by a locking lever 141, FIG. 13, which is rotatable about a vertical axis 142 that extends through a pivot bolt 143 on which the locking lever 141 is mounted. The pivot bolt 143 is stationarily mounted on the base plate section 122 and a torsion spring 144 is provided between it and the locking lever 141 and around the pivot bolt 143 for normally biasing the locking lever 141 to the retracted position or in a clockwise direction as viewed in FIG. 13. In order to apply the biasing force to the locking lever 141 the torsion spring 144 has one end 145 reacting against the outer side of the upstanding wall 120 while the other end 146 is hooked around an intermediate part of the locking lever 141.

The locking lever 141 overlies an upwardly offset section 149 from the base plate section 122 and an arcuate slot 150 is provided therein for receiving a clevis pin 151 and limiting its movement by engagement with the ends of the slot 150. The clevis pin 151 extends through the arms of a clevis 152 one of which overlies the top side of the locking lever 141 and the other underlies the lower surface of the offset section 149. The arcuate slot 150 and the clevis pin 151 form a lost motion connection between the cable 103 and the clamping cam 135 to limit its clamping action on the retractable belt 110. The bottom of the clevis 152 is provided with a cable terminal ball fitting 153 which has a sleeve 154 that is swaged to one end of the anchor cable 103. This provides a swivel connection between the anchor cable 103 and the clevis 152 and permits substantial latitude in the positioning of the anchor cable 103 on the floor 102 or elsewhere of the vehicle. At its other end the anchor cable 103 has a cable terminal ball fitting 155, FIG. 16, from which a sleeve 156 extends that is swaged onto the respective end of the anchor cable 103. As here shown the cable terminal ball fitting 155 is secured to a box like extension 157 of the buckle plate 107. A rubber filler 158 serves to hold the cable terminal ball fitting 155 in position within the box like extension 157 while permitting it to swivel with respect thereto. As shown in FIG. 13 a buckle plate boot 159 is slidably mounted on the end of the anchor cable 103 that is attached to the buckle plate 107 and it extends over the box like extension 157 therefrom. The boot 159 preferably is formed of suitable plastic material to facilitate ready telescoping over the box like extension 157.

FIG. 16 shows how the buckle plate 107 is detachably connected by the buckle 109 to the retractable belt 110 in encompassing relation to the occupant of the seat 100. Here it will be observed that the buckle 109 includes a bottom plate 160 having depending sides 161—161 through which a pivot pin 162 extends. Rotatably mounted on the pivot pin 162 is a locking dog 163 which has a nose portion 164 that is arranged to extend through the rectangular aperture 108 in the buckle plate 107 and also into an aperture 165 in the bottom plate 160. A coil compression spring 166 urges the locking dog 163 into the locked position. When the forward end of the buckle plate 107 is inserted in the left end of the buckle 109 it engages an inclined surface 167 on the locking dog 163 and swings it in a clockwise direction against the biasing action of the spring 166. The movement of the buckle plate 107 into the buckle 109 is limited by stops one of which is shown at 168. In this position the nose portion 164 of the locking dog 163 is free to enter the rectangular aperture 108 in the buckle plate 107 and to continue its movement into the aperture 165 in the bottom plate 160. This is the locked position shown in FIG. 16. A locking dog operating plate 169 is rotatably mounted on the pivot pin 162 and is provided with a conventional lost motion connection to the locking dog 163 which permits the latter to move independently of the former while permitting the locking dog operating plate 169, when rotated in a clockwise direction, as viewed in FIG. 16, to lift the locking dog 163 together therewith out of locking relation with the buckle plate 107 to permit the belt 110 to be retracted by the spiral spring 129. It will be observed here that a loop 170 at the outer end of the belt 110 extends over a transverse bar 171 that extends between the depending sides 161—161 of the buckle 109.

In describing the operation of the retractable belt 110, it will be assumed that it is in the retracted position as shown in FIG. 11 with the buckle 109 located at one side of the seat 100 and the buckle plate 107 located adjacent the other side. After being seated on the seat 100, the seat occupant grasps the buckle 109 with the left hand and pulls it sufficiently to engage the buckle plate 107 that is held in the right hand. The relationship between the buckle plate 107 and the buckle 109 in the attached encompassing position of the belt 110 and anchor cable 103 is shown in FIG. 16. As soon as the buckle 109 is released the spiral spring 129 rotates the reel 128 until the belt 110 is cinched snugly against the occupant. The tension applied by the spiral spring 129 to the belt 110 is transmitted through the buckle 109 and buckle plate 107 to the anchor cable 103. The tension force thus applied to the anchor cable 103 overcomes the biasing action of the torsion spring 144 and the locking lever 141 is rotated to cause the finger 140 thereon to engage the left side of the depending arm 139 as viewed in FIG. 14 which, it will be recalled, forms an integral part of the clamping cam 135. As a result the clamping cam 135 is rotated about the horizontal axis 138 in a counterclockwise direction to effect a corresponding rotation of the eccentric cam surface 134 and to bring the knurled surface portion 137 into registry with the reaction surface 132 on the cam shoe 133 with the belt 110 extending therebetween. It will be understood that the belt 110 is clamped transversely between the cam surface 134 and the reaction surface 132 and that these surfaces extend underneath and over the full width of the belt 110.

The rotation of the locking lever 141 about its vertical axis 142 continues until the clevis pin 151 engages the opposite end 172 of the slot 150 in the offset section 149 of the base plate section 122. Theerafter any additional tension applied to the anchor cable 103 is not transmitted to the locking lever 141 and thereby to the depending arm 139. However, since the knurled surface portion 137 of the eccentric cam surface 134 now underlies the belt 110 the clamping cam 135 becomes self energizing and additional tension applied to the belt 110 causes the clamping cam 135 to rotate still further in a counterclockwise direction to increase the clamping action against the reaction surface 132. In view of the increased coefficient of friction provided by the knurled surface portion 137 of the eccentric cam surface 134, slippage of the belt 110 between the clamping cam 135 and the cam shoe 133 is prevented.

The arrangement and construction of the retracting mechanism 115 are such that on the application of sufficient additional tension to the belt 110 after the clevis pin 151 has engaged the end 172 of the slot 150, the depending arm 139 leaves contact with the finger 140 so that the final clamping action is due to the self energizing action of the clamping cam 135 as its eccentric cam surface 134 is rotated about the horizontal axis 138. The reason for limiting the application of force by the anchor cable 103 to the locking lever 141 by engagement of the clevis pin 151 with the end 172 of the slot 150 is to prevent the application of such force to the clamping cam 135 that it would pinch the belt 110 between it and the cam shoe 133 with sufficient force as to sever it at this location. Since the forces that are involved in a sudden deceleration of the vehicle are relatively great, it will be understood that corresponding forces are applied to the belt 110 and the anchor cable 103. While use is made of these forces to prevent extension of the belt 110, they are controlled to the extent that they do not apply a sufficient force to the clamping cam 135 to more than securely clamp the belt 110 between it and the cam shoe 133 without applying the further force that would sever it and thus defeat the action of the belt 110 and anchor cable 103 in holding the seat occupant in place on the seat 100.

When the buckle 109 is released from the buckle plate 107, the tension force applied to the anchor cable 103 is removed. The torsion spring 144 then returns the locking lever 141 to the position shown in FIG. 13. The retraction force supplied by the spiral spring 129 now can rotate the reel 128 and retract the belt 110. The retraction force applied to the belt 110 by the spiral spring 129 rotates the clamping cam 135 in the clockwise direction about the horizontal axis 138 as seen in FIG. 14 to open the gap between the eccentric cam surface 134 and the reaction surface 132 on the cam shoe 133 to the end that there is no clamping action on the belt 110. In this position the belt 110 slides over the smooth surface portion 136 of the eccentric cam surface 134 and the apparent coefficient of friction between the belt 110 and the cam surface 134 becomes relatively low. The retraction force applied to the belt 110 by the spiral spring 129 continues to rotate the reel 128 until the buckle 109 reaches the storage position against the hockey stick clip 111 as seen in FIG. 11. If desired, a torsion spring can be applied to the clamping cam 135 in the manner that it is applied to the eccentric cam 63 as shown in FIG. 6 and described hereinbefore for the purpose of assisting in the rotation of the clamping cam 135 to the position shown in FIG. 14. However, it has been found that the addition of such a spring is unnecessary and that reliance can be placed on the retraction force exerted by the spiral spring 129 to rotate the clamping cam 135 to the unclamped position.

What is claimed as new is:

1. For combination with a vehicle having a seat, seat belt means for holding an occupant in place on said seat comprising anchor means, a retractable belt, means detachably interconnecting said anchor means and one end of said belt in encompassing relation to the seat occupant, means for retracting said belt on disconnection of it from said anchor means, clamping means for connection to the vehicle and operable by force applied by said belt on its movement in an extending direction for applying a clamping force transversely of said belt between said retracting means and said one end of said belt to prevent further extension of said belt, said clamping means including a stop member and a rotatable eccentric cam between which said belt is clamped, an arm extending radially from said cam, a lever adapted to be pivotally mounted on a part of said vehicle that is fixed thereto when it is in motion and having a finger for engaging said arm of said cam to rotate it in a clamping direction, and means connecting said anchor means to said lever to rotate it on application of force to said belt to cause said finger to engage said arm and rotate said cam toward said stop member to clamp said belt therebetween.

2. For combination with a vehicle having a seat, seat belt means for holding an occupant in place on said seat comprising anchor means, a retractable belt, means detachably interconnecting said anchor means and one end of said belt is encompasssing relation to the seat occupant, means for retracting said belt on disconnection of it from said anchor means, clamping means for connection to the vehicle and operable by force applied by said belt on its movement in an extending direction for applying a clamping force transversely of said belt between said retracting means and said one end of said belt to prevent further extension of said belt, said clamping means including a stop member and a rotatable eccentric cam between which said belt is clamped, an arm extending radially from said cam, a lever adapted to be pivotally mounted on the vehicle and having a finger for engaging said arm of said cam to rotate it in a clamping direction, means biasing said lever in a direction to move said finger away from said arm, and means connecting said anchor means to said lever to rotate it against the force exerted by said biasing means on application of force to said belt to cause said finger to engage said arm and rotate said cam toward said stop member to clamp said belt therebetween.

3. For combination with a vehicle having a seat, seat belt means for holding an occupant in place on said seat comprising anchor means, a retractable belt, means detachably interconnecting said anchor means and one end of said belt in encompassing relation to the seat occupant, means for retracting said belt on disconnection of it from said anchor means, clamping means for connection to the vehicle and operable by force applied by said belt on its movement in an extending direction for applying a clamping force transversely of said belt between said retracting means and said one end of said belt to prevent further extension of said belt, said clamping means including a stop member and a rotatable eccentric cam between which said belt is clamped, an arm extending radially from said cam, a lever adapted to be pivotally mounted on the vehicle and having a finger for engaging said arm of said cam to rotate it in a clamping direction, means connecting said anchor means to said lever to rotate it on application of force to said belt to cause said finger to engage said arm and rotate said cam toward said stop member to clamp said belt therebetween, and means limiting rotation of said lever by said anchor means whereby the clamping action of said eccentric cam on said belt caused by force applied by said anchor means is limited and further clamping action of said eccentric cam on said belt is caused only by force applied by said anchor means to said lever is ineffective to increase the clamping action of said eccentric cam.

4. Retractable seat belt means for mounting on a part of a vehicle, such as the floor thereof, that is fixed thereto when it is in motion for holding an occupant in place on a seat on said vehicle comprising, in combination, a support adapted to be secured to said floor underneath said seat and including a base plate and upstanding walls in spaced relation, a reel rotatably mounted between said walls, a seat belt wound on said reel, a spring biasing said reel in a direction to retract said seat belt and wind it on said reel, a cam shoe extending between said walls and having a downwardly facing concave reaction surface overlying said seat belt as one end thereof extends from said reel, a cam mounted between said walls for rotation about a horizontal axis below said cam shoe and offset to the side away from said reel and having an eccentric cam surface underlying said seat belt and movable toward and away from said reaction surface on said cam shoe for clamping said seat belt therebetween, an arm extending radially from said cam, a lever mounted on said base plate to rotate about a vertical axis and having a finger for engaging said arm on said cam to move said cam surface toward said reaction surface, and a flexible anchor member connected at one end to said lever and detachably connected at its other end to said seat belt in encompassing relation to the seat occupant for rotating said lever on application of force to said seat belt.

5. The invention, as set forth in claim 4, wherein the base plate has a slot, and the lever carries a stop member that extends into said slot whereby rotation of said lever by force applied thereto by the anchor member is limited on engagement of said stop member with one end of said slot.

6. The invention, as set forth in claim 4, wherein a spring biases the lever for rotation in a direction opposite to the direction in which it is rotated by force applied thereto by the anchor member.

7. A seat belt assembly adapted to be mounted for use with a seat comprising a seat belt, a storage case therefor, said seat belt being movable from a stored to an operating position, retracting means in said storage case to retract said seat belt into said storage case, locking means for securing one end of said seat belt adjacent said storage case when said seat belt is in operating position, anchoring means spaced from said storage case adapted to cooperate with the other end of said seat belt to secure said other end of the seat belt in operating position and actuating means in said anchoring means interconnected with said locking means, said actuating means being adapted to cooperate with said other end of the seat belt to actuate said locking means.

8. A seat belt assembly as claimed in claim 7 wherein the retracting means is a spring biased reel rotationally supported in said storage case to which one end of said seat belt is secured to be wound thereabout.

9. A seat belt assembly as claimed in claim 7 wherein a control cable is used to interconnect said actuating means and said locking means.

10. A retractable seat belt assembly adapted to be mounted for use with a seat, said assembly comprising a first belt anchoring means including a storage case, a seat belt having one end secured within the case, means for normally retracting the belt into said case, a second belt anchoring means spaced from said case and operable to detachably fasten the other end of the belt when the belt is withdrawn from the case to an extended operating position, and means operably interconnected between said belt anchoring means and operated by the fastening of said other belt end by said second belt anchoring means to condition said first anchoring means to prevent further withdrawal of the belt from the storage case.

11. A seat belt assembly mountable for use with a vehicle seat, said assembly comprising a seat belt, means for mounting said seat belt for movement between a stored position and an extended operating position, locking means for securing said seat belt adjacent said belt mounting means, an anchoring means spaced from said belt mounting means and adapted to latchably secure the extended end of the seat belt to maintain the seat belt in an extended operating position, and means associated with said anchoring means and operably connected for actuation by the securing of said extended belt end to actuate said locking means to secure the seat belt adjacent the belt mounting means.

12. A seat belt assembly adapted to be mounted for use with a seat comprising a seat belt, a storage case therefor, said seat belt being movable from a stored to an operating position, retracting means in said storage case to retract said seat belt into said storage case, locking means for securing one end of said seat belt adjacent said storage case when said seat belt is in operating position, anchoring means spaced from said storage case adapted to cooperate with the other end of said seat belt to secure said other end of the seat belt in operating position, and actuating means for said anchoring means interconnected with said locking means, said actuating means being adapted to actuate said locking means by force applied by said belt on its movement in an extending direction.

13. A seat belt assembly as claimed in claim 12 wherein the retracting means is a spring biased reel rotationally supported in said storage case to which one end of said seat belt is secured to be wound thereabout.

14. A seat belt assembly as claimed in claim 12 wherein a control cable is used to interconnect said actuating means and said locking means.

15. A retractable seat belt assembly adapted to be mounted for use with a seat, said assembly comprising a first belt anchoring means including a storage case, a seat belt having one end secured within the case, means for normally retracting the belt into said case, a second belt anchoring means spaced from said case and operable to detachably fasten the other end of the belt when the belt is withdrawn from the case to an extended operating position, and means operably interconnected between said belt anchoring means and said belt and operated by force applied by said belt on its movement in an extending direction to condition said first anchoring means to prevent further withdrawal of the belt from the storage case.

16. A seat belt assembly mountable for use with a vehicle seat, said assembly comprising a seat belt, means for mounting said seat belt for movement between a stored position and an extended operating position, locking means for securing said seat belt adjacent said belt mounting means, an anchoring means spaced from said belt mounting means and adapted to latchably secure the extended end of the seat belt to maintain the seat belt in an extended operating position, and means associated with said anchoring means and operably connected for actuation by force applied by said belt on its movement in an extending direction to actuate said locking means to secure the seat belt adjacent the belt mounting means.

17. For combination with a vehicle having a seat, seat belt means for holding an occupant in place on said seat comprising anchor means, a retractable belt, means detachably interconnecting said anchor means and one end of said belt in encompassing relation to the seat occupant, means connected to said seat belt remote from said one end thereof for retracting it on disconnection from said anchor means, clamping means for connection to the vehicle and operable by force applied by said belt on its movement in an extending direction for applying a clamping force transversely of said belt between said retracting means and said one end of said belt to prevent further extension of said belt, said clamping means including a stop member and a rotatable eccentric cam between which said belt is clamped, means operatively interconnecting said anchor means and said eccentric cam to rotate it into clamping engagement with said belt on application of predetermined force to said anchor means, means limiting the clamping action of said eccentric cam caused by force applied by said anchor means, and means providing a lost motion connection between said eccentric cam and said anchor means whereby further clamping action of said eccentric cam is the result solely of force applied by the belt and further force applied by said anchor means is ineffective to incease the clamping action of said eccentric cam.

References Cited

UNITED STATES PATENTS

| | | | |
|---|---|---|---|
| 913,469 | 2/1909 | Cleaveland | 24—170 |
| 2,071,903 | 2/1937 | Shively | 297—386 |
| 2,622,293 | 12/1952 | Wermlinger | 24—170 |
| 2,705,529 | 4/1955 | Bull | 297—386 |
| 2,947,353 | 8/1960 | Wimmersperg | 297—388 |
| 2,971,730 | 2/1961 | Martin | 244—122 |

CASMIR A. NUNBERG, *Primary Examiner.*

FRANK B. SHERRY, *Examiner.*